3,300,407
PROCESS FOR DEWATERING AN AQUEOUS SUSPENSION OF ORGANIC WASTE SOLIDS
Charles P. Priesing and Stanley Mogelnicki, both of Midland, Mich., assignors to The Dow Chemical Company, Midland, Mich., a corporation of Delaware
Filed Aug. 6, 1965, Ser. No. 477,747
8 Claims. (Cl. 210—53)

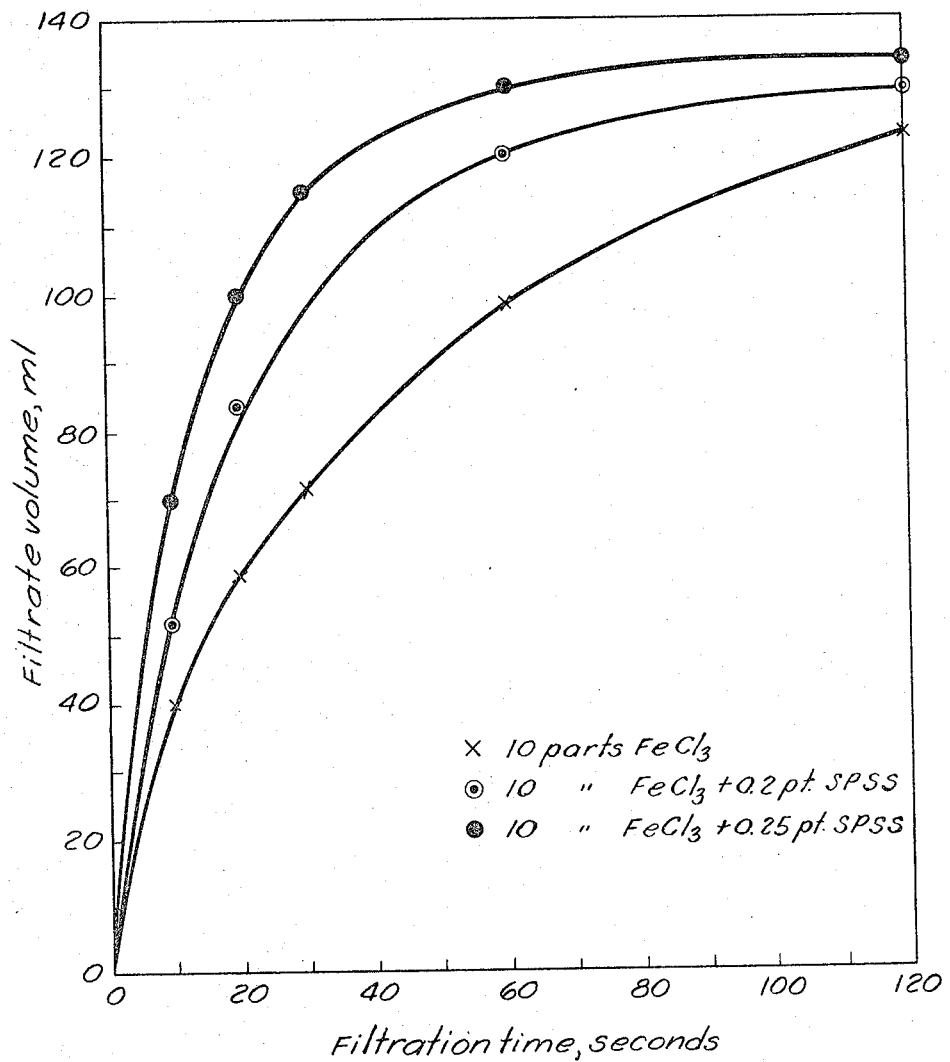

This invention concerns an improved process for dewatering aqueous suspensions of finely-divided organic waste solids, particularly the sludge obtained in the disposal of municipal and industrial wastes and sewage. More specifically it relates to a process for conditioning sewage sludge from the disposal of municipal and industrial wastes to obtain improved filtration rates in the dewatering process. The process consists essentially in conditioning the suspended solids by intermixing therewith in combination an essentially linear, water-soluble, high molecular weight anionic polymer containing an average of at least 0.25 sulfonic groups per monomer unit and an inorganic primary coagulant.

In the processing of municipal and industrial wastes, large volumes of water must be processed to remove suspended solids. Direct filtration particularly of the finely-divided, hydrophilic organic solids is a slow and costly process. Thus preliminary concenetration in settling tanks, often with the addition of inorganic or cationic organic flocculants is generally employed. A thickened slurry containing 0.25–12 percent solids is removed continually, or intermittently from the settling tank and filtered by gravity or differential pressure. The recovered filter cake is then disposed by land fill, incineration, or other suitable means. Particularly when the recovered solids are used as a fuel or fertilizer, a minimum residual water content in the filter cake is highly desirable.

Inorganic salts of iron and aluminum have often been used in the conditioning of such organic waste sludge for dewatering. Yet to achieve effective results high dosages are required. With $FeCl_3$, for example, 150–250 lbs. per ton of treated sludge on a dry weight basis is often a minimum dose, e.g. 75–125 parts $FeCl_3$ per thousand parts solids. At times as much as 500 parts $FeCl_3$ per thousand parts solids is used. Such dosages greatly increase the inorganic content of the recovered solids and detract appreciably from its value as a fuel or fertilizer.

It has now been discovered that intermixing a relatively small amount of a high molecular weight anionic polymer with the organic waste slurry prior to a final treatment with a primary inorganic coagulant not only reduces the amount of inorganic coagulant that is required, but also markedly increases the rate and efficiency of the dewatering process. The present improved dewatering process therefore consists essentially in conditioning the suspended waste solids prior to filtration by (A) intermixing therewith from about 0.01 to 5 parts per thousand parts solids of a water-soluble anionic polymer having an average molecular weight as determined by viscosity measurements of at least 0.5 million, said polymer containing as the anionic moiety at least 0.25 sulfonate groups per monomer unit; and (B) then adding 5 to 100 parts per thousand parts solids of a primary inorganic coagulant. Particularly suitable as the anionic polymer is a high molecular weight, water-soluble poly(vinylaromatic sulfonate).

By this improved process, which is sometimes referred to as a dual system, not only can the amount of $FeCl_3$ or other primary inorganic flocculant be decreased, but the drainage of the filter cake is markedly enhanced. For example, with a digested sludge, this process gives a filter cake containing 25–60 weight percent solids compared with only 25–40 weight percent solids by conventional methods. The drier filter cake is easier to handle. Also the volume of final solids to be disposed is reduced.

This improved dewatering process is particularly suited for use in the treatment of raw and digested municipal sewage. Still more generally it is applicable to aqueous suspensions of finely-divided hydrophilic organic solids characterized by a negative zeta potential. Such aqueous suspensions are commonly encountered in waste streams from textile, paper, and petroleum refining operations as well as in meat packing and vegetable, fruit or other food processing.

ANIONIC POLYMERS

Essential in the improved dewatering process described herein is a water-soluble, high molecular weight anionic polymer containing at least 0.25 sulfonate groups per monomer unit. By "water-soluble" is meant dispersible in water to give a visually homogeneous and substantially transparent solution infinitely dilutable with water. "High molecular weight" as applied to these anionic polymers refers to an average molecular weight of at least 0.5 million as determined by standard light scattering or viscosity measurements. The functional anionic groups are obtained for example by polymerizing a vinyl monomer such as sodium styrene sulfonate.

A preferred anionic polymer is an essentially linear, water-soluble, high molecular weight poly(vinylaromatic sulfonate) characterized by a plurality of moieties of the formula:

$$-\mathrm{CH-CH_2-}$$
$$\quad\;\;|$$
$$\mathrm{Ar-SO_3M}$$

wherein Ar is a $C_6$–$C_7$ aromatic hydrocarbon moiety and M is a monovalent cation. Particularly satisfactory is a high molecular weight sodium poly(styrene sulfonate), herein referred to as SPSS, such as prepared by the vinyl addition polymerization of sodium styrene sulfonate under alkaline conditions.

Alternately, water-soluble poly(vinylaromatic sulfonate)s can be prepared by the sulfonation of an essentially linear, high molecular weight vinylaromatic polymer such as polystyrene, polyvinyltoluene, poly-α-methylstyrene and mixtures thereof. Suitable techniques for obtaining a water-soluble poly(vinylaromatic sulfonate) by direct sulfonation are described for example by Roth in U.S. Patent 3,033,834, and by Bauman et al. in U.S. Patent 2,821,522. A further useful sulfonation process for obtaining a uniformly sulfonated polymer essentially free of sulfone cross-linking is described by Turbak in U.S. Patent 3,072,618.

For use herein a poly(vinylaromatic sulfonate) must contain an average of at least 0.25 sulfonic group per monomer unit, i.e., an average of at least 0.25 sulfonic group per molecule of polymerized styrene in a sulfonated polystyrene. Polymers containing an average of at least 0.6 sulfonic group per monomer unit are particularly effective.

The water-soluble poly(vinylaromatic sulfonate) must also have a molecular weight of at least 0.5 million and preferably 2.0 million or higher. Conveniently the molecular weight of a poly(vinylaromatic sulfonate) is characterized by the reduced viscosity of a solution of its sodium salt in dilute aqueous NaCl solution at 30° C. More specifically the reduced viscosity is determined using a solution of 0.4 g. of the sodium poly(vinylaromatic sulfonate) in 100 ml. (1 dl) of 0.5 N NaCl and a calibrated capillary viscometer. The reduced viscosity in dl/g. is calculated from the formula:

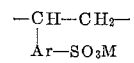

$$Nr = \frac{N' - N}{Nc}$$

wherein:

$N_r$ is the reduced viscosity,
$N'$ is the viscosity of the polymer in 0.5 N NaCl,
$N$ is the viscosity of the 0.5 N NaCl, and
$C$ is the polymer concentration (g./dl).

To have an appreciable effect on the dewatering process, the poly(vinylaromatic sulfonate) should have a minimum reduced viscosity of 6.0 dl/g., corresponding to a molecular weight of about 1 million. A reduced viscosity of 20–50 dl/g., corresponding to an estimated molecular weight of about 4–10 million, is preferred. But advantageous results are also obtained with a sulfonated vinylaromatic polymer having a higher reduced viscosity provided that it is water-soluble at the desired concentration.

Normally these sulfonated polymers are prepared and used in a water-soluble salt form obtained by neutralizing the sulfonic acid groups with a suitable base such as sodium hydroxide, potassium carbonate, ammonia, or a water-soluble lower alkyl amine. In use, the pH of the aqueous solution containing the anionic polymer can be adjusted as required with a suitable acid or base.

Another type of sulfonated polymer suitable for use in the present process are copolymers of a vinylaromatic sulfonate monomer with a minor proportion of a monomer copolymerizable therewith such as acrylamide, methacrylamide, acrylonitrile, methacrylonitrile, styrene, vinyl toluene, and methyl acrylate. Such copolymers must contain an average of at least 0.25 sulfonic groups per monomer unit and have a molecular weight of at least 0.5 million and preferably 2.0 million or more.

PRIMARY INORGANIC COAGULANT

The second element in the present dual system for conditioning organic waste sludge is a conventional primary inorganic coagulant such as $FeCl_3$, $FeSO_4$, 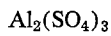 $Al_2(SO_4)_3$ $CaCl_2$ and $CaO$. Normally $FeCl_3$ is preferred. Because of the greater efficiency of the present process, the amount of inorganic coagulant required is appreciably reduced.

CONDITIONING PROCESS

To obtain improved dewatering of the organic waste sludge, the suspended finely-divided solids are conditioned prior to filtration by intermixing therewith the anionic polymer and then the inorganic primary coagulant. The precise point or time during the waste treatment process when the anionic polymer is added is not critical so long as an effective concentration is present in the final conditioning tank when the inorganic coagulant is added. Sometimes it is convenient to add the anionic polymer to a preliminary thickener rather than to the final tank.

The anionic polymer is conveniently added to the process stream as an aqueous solution containing about 0.01 to 5.0 weight percent solids. Gentle agitation of the aqueous suspension to achieve uniform mixing of the polymer during addition is desirable. Such mixing can be achieved with slowly rotating paddles, passage through baffled conduits, injection of air, or other similar means. Too vigorous agitation should be avoided to prevent destruction of partially agglomerated solids.

The amount of anionic polymer required for optimum results depends of course on the particular material being treated as well as on the polymer, particularly its anionic content and molecular weight. But in general, effective results are obtained using about 0.01 to 5 parts of anionic polymer per thousand parts of suspended solids on a dry weight basis. Preferably a polymer concentration of 0.05 to 1.5 parts per thousand parts is used.

The inorganic coagulant should be added to the aqueous sludge suspension containing the anionic polymer just before filtration. Best results are obtained by filtering the suspension as soon as possible after intermixing the primary coagulant. The amount of primary coagulant required to achieve the desired rapid dewatering of the filter cake depends on the inorganic coagulant, on the nature of the sludge and its prior treatment, and on the concentration of the suspended solids and the anionic polymer.

When $FeCl_3$ is used as the primary coagulant in the dual treatment process of an aqueous suspension containing 5 to 10 percent solids, about 5 to 50 parts of $FeCl_3$ per thousand parts of suspended solids is desirable. With $Al_2(SO_4)_3$ and other inorganic coagulants less efficient than $FeCl_3$, a larger amount is required. However, for given aqueous suspension of waste solids, routine filtration tests using samples treated with several concentrations of the anionic polymer and a primary inorganic coagulant will rapidly establish the desirable operating limits to achieve the enhanced dewatering through use of the dual treatment process.

The dual treatment process described herein is generally effective in processing waste streams having a pH between about 2–10. However, optimum efficiency may be obtained by operating at about the isoelectric point of the system.

In summary, the present improved process for the dewatering of organic solids concerns adding to the suspended sludge a combination of a high molecular weight, anionic polymer and a primary inorganic coagulant. The process can be used alone or in conjunction with other mechanical, biological or chemical processing of the organic waste stream. Because of the finely-divided and hydrophilic nature of the solids, complete water removal by pressure or vacuum filtration is of course not possible even with the present improved dewatering process. However, the filter cake obtained by this improved process contains substantially less residual water than that recovered after conventional conditioning treatment. Also the reduced inorganic content enhances the value of the recovered solids as a fuel or fertilizer. Other process and economic advantages will be evident in practice.

To illustrate further the present invention and its advantages, the following examples are given without limitation of the invention thereto. Unless otherwise specified, all parts and percentages are by weight.

*Example 1.—$FeCl_3$-SPSS system*

To evaluate the efficiency of various anionic polymers and primary inorganic coagulants in a dual treatment process, the following standard filtration test was used. To 100 ml. of a stock digested municipal sewage containing about 10 weight percent organic solids was added 25 ml. of water containing a calculated amount of anionic polymer. The test mixture was gently mixed by pouring it several times from one beaker into another. The desired amount of primary inorganic coagulant was added with an additional 25 ml. of water. After pouring four times from one beaker into another, the treated test mixture was poured into a 12.5 cm. Buchner funnel fitted with two pieces of No. 1 Whatman filter paper and attached to the calibrated receiver under a vacuum of 9–27 in. Hg. The filtrate volume was periodically recorded. Two minutes after the initial transfer of the treated slurry to the Buchner funnel, the vacuum was released and the filter cake removed. The moisture content of the filter cake was determined by drying under standard conditions.

Using the standard test, filtration rates were determined for an anionic sodium polystyrene sulfonate (SPSS) used in conjunction with $FeCl_3$. Typical results at several loading levels and at an initial vacuum of 25 in. Hg are given in Table 1. The SPSS had a reduced viscosity of 30 dl/g. as a 0.4 weight percent solution in 0.5 N NaCl at 30° C. This viscosity corresponds to an average molecular weight at about 6.1 million as estimated from light scattering data.

TABLE 1.—SPSS-FeCl₃ DUAL SYSTEM

| Run | Added Reagent [1] | | Filtrate Volume, ml. | | | | | Filter Cake Solids, Percent |
|---|---|---|---|---|---|---|---|---|
| | SPSS | FeCl₃ | 10 sec. | 20 sec. | 30 sec. | 60 sec. | 120 sec. | |
| 1-1 | 0 | 5 | 25 | 40 | 48 | 66 | 95 | 18 |
| 1-2 | 0 | 10 | 40 | 58 | 72 | 98 | 125 | 40 |
| 1-3 | 0 | 25 | 60 | 90 | 105 | 120 | 126 | 42 |
| 1-4 | 0 | 50 | 60 | 92 | 110 | 120 | 126 | 42 |
| 1-5 | 0.05 | 5 | 40 | 60 | 72 | 100 | 120 | 33 |
| 1-6 | 0.12 | 5 | 55 | 75 | 90 | 115 | 126 | 42 |
| 1-7 | 0.25 | 5 | 45 | 70 | 90 | 115 | 130 | 50 |
| 1-8 | 0.12 | 10 | 52 | 84 | 110 | 120 | 128 | 45 |
| 1-9 | 0.25 | 10 | 70 | 100 | 115 | 130 | 134 | 63 |
| 1-10 | 0.25 | 25 | 70 | 100 | 115 | 125 | 129 | 48 |

[1] Parts per thousand parts organic solids.

Comparative filtration rates from Runs 1-2, 1-8 and 1-9 are shown graphically in the accompanying figure. The increase in filter cake solids from a maximum of 42 percent with FeCl₃ alone to 63 percent with the SPSS-FeCl₃ system is equivalent to a reduction in the residual water content from 1.4 to 0.6 part per part of dry solids.

Similar enhanced filtration rates are obtained with other sodium polystyrene sulfonates having an average molecular weight calculated from the reduced viscosity of 1.0 million or more. With a molecular weight less than 0.5 million, little activity is found even with a much higher loading.

*Example 2.—Other SPSS dual systems*

A. In another series of tests similar to Example 1, the effect on the filtration rate of using a minor amount of a high molecular weight poly(vinylaromatic sulfonate) on the dewatering of the municipal sewage in conjunction with other primary inorganic coagulants was examined. Table 2 presents typical results from a SPSS-Al₂(SO₄)₃ system. The SPSS had a reduced viscosity of 30 dl/g. corresponding to an average molecular weight of about 6.1 million. Note the particularly rapid initial dewatering achieved with the dual system.

B. The two minute filtrate volume is also used occasionally as a basis for comparing the effectiveness of various treatments. Typical results given in Table 3 show comparative two minute filtrate volumes for several SPSS dual systems. The SPSS (6.1 million) was used at a loading of 0.5 part per thousand while the loading of the primary inorganic coagulant was varied to obtain maximum 2 minute filtration.

TABLE 2.—SPSS-Al₂(SO₄)₃ SYSTEM

| Run | Added Reagent [1] | | Filtration Volume, ml. | | | | | Filter Cake Solids, Percent |
|---|---|---|---|---|---|---|---|---|
| | SPSS | Al₂(SO₄)₃ | 10 sec. | 20 sec. | 30 sec. | 60 sec. | 120 sec. | |
| 2-1 | 0 | 50 | 38 | 55 | 70 | 95 | 120 | 33 |
| 2-2 | 0 | 150 | 40 | 56 | 70 | 97 | 116 | 30 |
| 2-3 | 0.5 | 50 | 60 | 90 | 105 | 117 | 122 | 36 |

[1] Parts per thousand parts organic solids.

TABLE 3.—SPSS DUAL SYSTEM

| Run | Inorganic Coagulant [1] | 2 minute Volume, ml. | |
|---|---|---|---|
| | | Inorganic | SPSS [2] +Inorg. |
| 3-1 | 30 FeCl₃ | 100 | 128 |
| 3-2 | 40 Al₂(SO₄)₃ | 50 | 126 |
| 3-3 | 60 CaCl₂ | 40 | 116 |
| 3-4 | 75 CaO | 70 | 125 |

[1] Concentration in parts per thousand.
[2] 0.5 parts per thousand.

*Example 3.—Other anionic polymers*

A. Typical results from the standard two minute filtration test using a high molecular weight, water-soluble sulfonated polyvinyltoluene (SPVT) in combination with FeCl₃ are presented in Table 4.

TABLE 4.—SPVT-FeCl₃ SYSTEM

| Run | Added Reagents [1] | | Filtrate Volume, ml. | | | | | Filter Cake Solids, Percent |
|---|---|---|---|---|---|---|---|---|
| | SPVT [2] | FeCl₃ | 10 sec. | 20 sec. | 30 sec. | 60 sec. | 120 sec. | |
| 4-1 | 0 | 10 | 40 | 58 | 72 | 98 | 125 | 40 |
| 4-2 | 0.12 | 10 | 40 | 64 | 78 | 106 | 126 | 42 |
| 4-3 | 0.25 | 10 | 46 | 70 | 86 | 115 | 128 | 45 |
| 4-4 | 0.50 | 10 | 55 | 80 | 100 | 125 | 133 | 59 |

[1] Parts per thousand.
[2] Estimated MW $>2\times10^6$.

B. In another test a raw municipal sludge containing 7 percent solids was used. Typical data from a standard 2 minute filtration with an initial test volume of 130 ml. are given in Table 5 and show the improved results obtained using the anionic polymers in combination with FeCl₃.

TABLE 5.—ANIONIC POLYMERS-FeCl₃

| Run | Added Reagents [1] | | Filtrate, ml. |
|---|---|---|---|
| | Anionic Polymer [2] | FeCl₃ | |
| 5-1 | None | 5 | 88 |
| 5-2 | 0.12 SPSS-4.6 | 5 | 110 |
| 5-3 | 0.12 SPSS-7.9 | 5 | 110 |

[1] Concentration in parts per thousand.
[2] SPSS-4.6 a homopolymer of sodium styrene sulfonate with an estimated MW of $4.6\times10^6$; SPSS-7.9 a homopolymer of sodium styrene sulfonate with an estimated MW of $7.9\times10^6$.

Example 4.—Waste paper sludge treatment

To illustrate the effectiveness of the dual treatment process with industrial wastes, tests were made using a commercial paper waste stream containing 1.7 percent solids. In this test series, 150 ml.-samples of the waste slurry were treated with a standard 0.25 part per thousand of high molecular weight SPSS and from 25–50 parts per thousand of $FeCl_3$. The final volume of the test slurry prior to filtration was 220 ml.

The comparative ten second filtrate volumes given in Table 6 clearly show the enhanced filtration rate obtained with the dual treatment process. Similar results are obtained with other organic industrial wastes.

TABLE 6.—WASTE PAPER SLUDGE TREATMENT

| Run | $FeCl_3$ Conc.[1] | Filtrate Volume, ml. | |
| --- | --- | --- | --- |
| | | $FeCl_3$ | SPSS[2]+$FeCl_3$ |
| 6-1 | 25 | 25 | 90 |
| 6-2 | 37.5 | 74 | 130 |
| 6-3 | 50 | 80 | 170 |

[1] Parts per thousand parts solids.
[2] 0.25 part SPSS (6.1 million) per thousand.

Example 5.—Field test

Pilot and full scale dewatering tests of the dual system were run in a municipal sewage treatment plant employing large rotary vacuum filters having a filter area of about 56 sq. ft. The sludge contained about 7 percent solids and was pumped into a 150 gallon chemical conditioning tank at a rate of 10–40 gallons per minute. The tank was equipped with mixing paddles operating at 15 r.p.m. A 1 percent aqueous solution of sodium polystyrene sulfonate (M.W. $4-8 \times 10^6$) was fed into a secondary dilution tank and then added to the conditioning tank near the sewage inlet to give a polymer concentration of 0.25 part per thousand parts solids. Subsequently 5 parts per thousand $FeCl_3$ was added. The treated sludge overflowed into a sludge pan which fed the rotary vacuum filter. The filter drum speed was about 2 r.p.m. Pickup of the treated sewage solids by the rotary filter was excellent. A very thick and dry cake was produced as a result of the dual anionic polymer -$FeCl_3$ treatment.

We claim:
1. In a process for dewatering an aqueous suspension of finely-divided organic waste solids by conditioning the aqueous suspension with chemical additives and thereafter filtering the conditioned suspension, the improvement in conditioning the aqueous suspension which consists essentially of:

(A) Intermixing with said aqueous suspension from about 0.01 to 5 parts per thousand parts waste solids of a water-soluble anionic poly(vinylaromatic sulfonate) having an average molecular weight as determined by viscosity measurements of at least 0.5 million, said polymer containing as the anionic moiety an average of at least 0.25 sulfonate groups per monomer unit; and
   (B) Thereafter adding to said aqueous suspension 5 to 100 parts per thousand parts waste solids of a primary inorganic coagulant.

2. The process of claim 1 wherein the primary inorganic coagulant is selected from the group consisting of ferric chloride, aluminum sulfate, calcium chloride and calcium oxide.

3. The process of claim 1 wherein the anionic polymer is sodium polystyrene sulfonate.

4. The process of claim 1 wherein the anionic polymer is a sulfonated polyvinyltoluene.

5. The process of claim 1 wherein the anionic polymer is a poly(vinylaromatic sulfonate) and the primary inorganic coagulant is ferric chloride.

6. The process of claim 5 wherein the anionic polymer is sodium polystyrene sulfonate.

7. The process of claim 6 wherein the sodium polystyrene sulfonate has a reduced viscosity of at least 6.0 dl./g. as a 0.4 weight percent solution of polymer in 0.5 N NaCl at 30° C.

8. The process of claim 6 wherein the sodium polystyrene sulfonate has a reduced viscosity of 20–50 dl./g. as a 0.4 weight percent solution of polymer in 0.5 N NaCl at 30° C.

References Cited by the Examiner

UNITED STATES PATENTS

| | | | |
| --- | --- | --- | --- |
| 3,009,873 | 11/1961 | Kerr et al. | 210—53 |
| 3,118,832 | 1/1964 | Katzer et al. | 210—54 |
| 3,142,638 | 7/1964 | Blaisdell et al. | 210—54X |
| 3,194,757 | 7/1965 | Sullivan | 210—52 |

FOREIGN PATENTS

| | | |
| --- | --- | --- |
| 589,543 | 12/1959 | Canada. |
| 607,440 | 10/1960 | Canada. |
| 637,703 | 3/1962 | Canada. |

OTHER REFERENCES

Bargman et al.: Sludge Filtration, etc., Sew. and Ind. Wastes, vol. 30 September 1958, pp. 1079–1100.

MORRIS O. WOLK, *Primary Examiner.*

MICHAEL E. ROGERS, *Examiner.*